No. 762,353. PATENTED JUNE 14, 1904.
D. J. SCHULTE.
TARGET TRAP.
APPLICATION FILED FEB. 24, 1903.
NO MODEL.
2 SHEETS—SHEET 1.

Witnesses:

Inventor.
D. J. Schulte.

No. 762,353. PATENTED JUNE 14, 1904.
D. J. SCHULTE.
TARGET TRAP.
APPLICATION FILED FEB. 24, 1903.
NO MODEL. 2 SHEETS—SHEET 2.
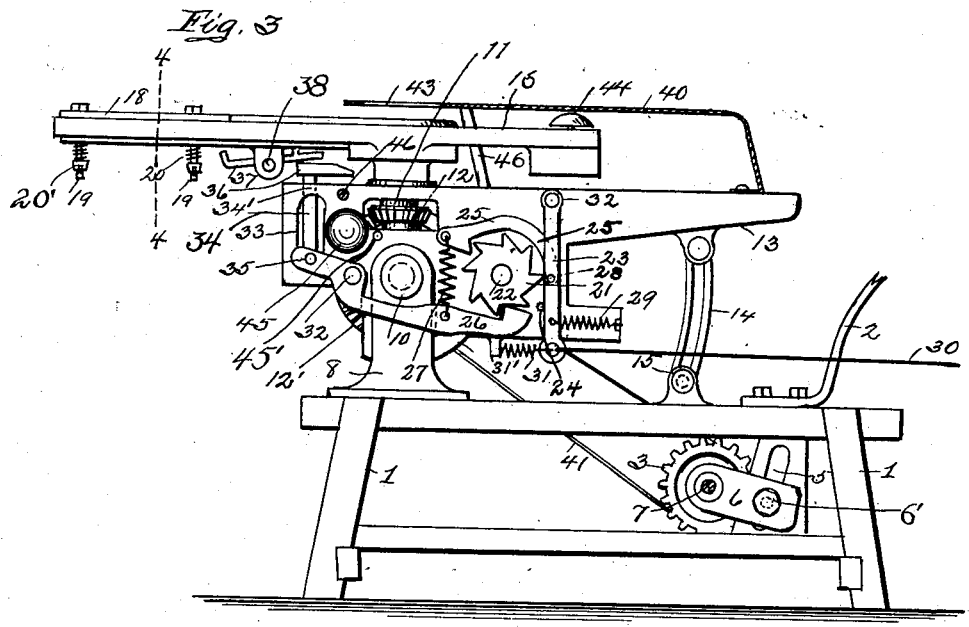
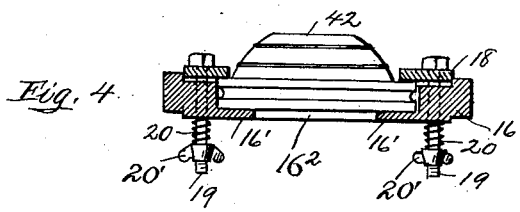
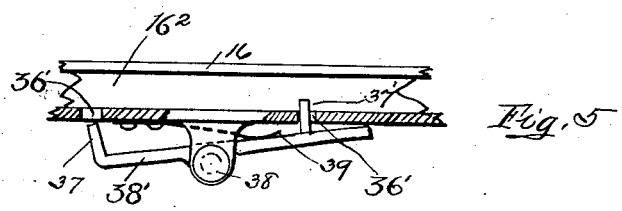

No. 762,353. Patented June 14, 1904.

UNITED STATES PATENT OFFICE.

DAVID J. SCHULTE, OF LATROBE, PENNSYLVANIA.

TARGET-TRAP.

SPECIFICATION forming part of Letters Patent No. 762,353, dated June 14, 1904.

Application filed February 24, 1903. Serial No. 144,703. (No model.)

*To all whom it may concern:*

Be it known that I, DAVID J. SCHULTE, a citizen of the United States, residing at Latrobe, in the county of Westmoreland and State of Pennsylvania, have invented a new and useful Improvement in Inanimate-Target Traps, of which improvement the following is a specification.

This invention relates to an improved inanimate-target trap; and it consists in the certain details of construction and combination of parts, as will be fully described hereinafter.

Figure 1:
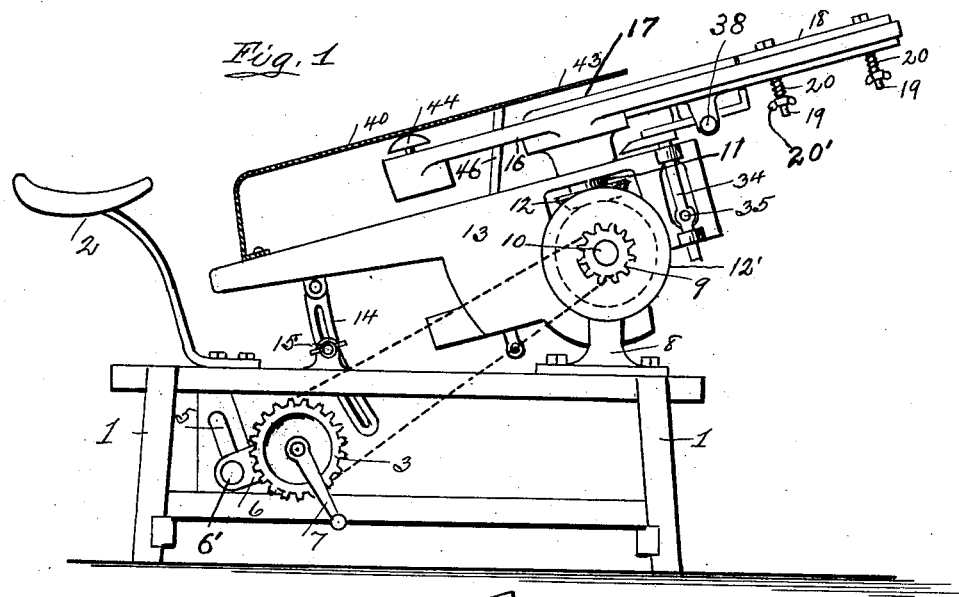
Figure 2:
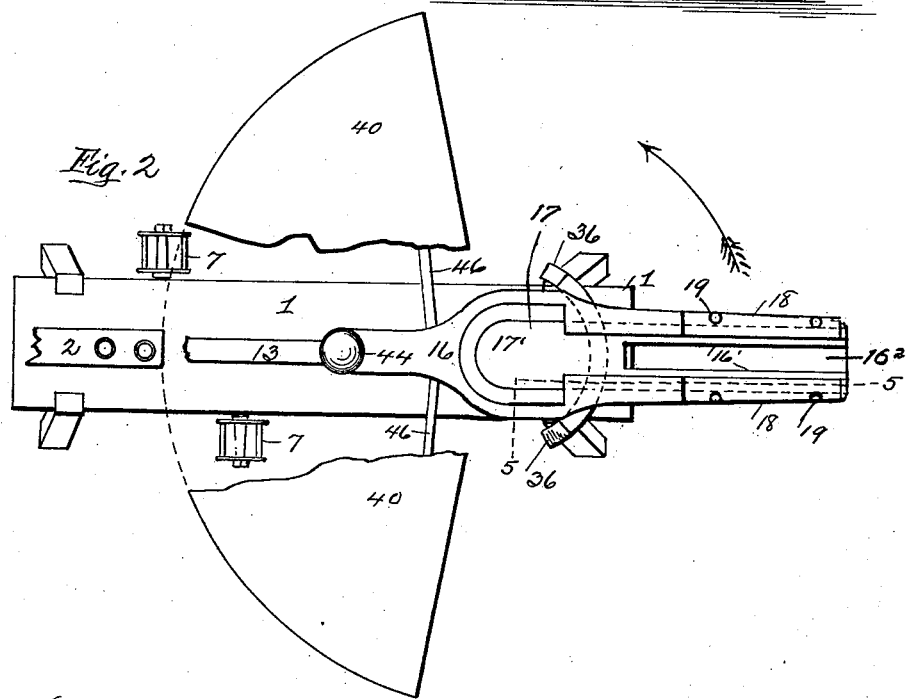

In the accompanying drawings, Figure 1 is a side elevation of my improved trap, the same being constructed and arranged in accordance with my invention. Fig. 2 is a plan view of the same. Fig. 3 is a side elevation of the opposite side of the trap, showing the mechanism for releasing the target from the throwing-arm. Fig. 4 is a vertical transverse section through the throwing-arm on the line 4 4 of Fig. 3. Fig. 5 is a broken longitudinal vertical section through said arm on the line 5 5 of Fig. 2.

To put my invention into practice, and thereby provide a trap for throwing inanimate targets, I provide a frame 1 of a suitable size and form of construction and arrange thereon a seat 2 for the operator. Beneath this seat 2 are foot-pedals 7, connected to a sprocket-wheel 3 and arranged in adjustable bearings 6, capable of being moved vertically in a slot 5 and clamped in the desired position by a screw-nut 6'. Placed on the forward end of the frame 1 is a standard 8, carrying a shaft 10, upon which is mounted a movable or tilting frame 13, and the said frame 13 provided with a slotted link 14, which passes through the frame 1 and may be set or held rigid by means of a thumb-screw 15. Mounted upon this same shaft 10 is a sprocket-pinion 9 and an attached bevel gear-wheel 12', the said sprocket 9 being connected to the sprocket 3 by a chain belt, and the said bevel-wheel 12', in mesh with a bevel-pinion 12, secured to a shaft 11, arranged in a vertical position in the forward portion of the movable frame 13. Attached to the upper end of the shaft 11 is a throwing-arm 16, the forward end of which is formed with ways 16', projecting toward each other into an opening $16^2$. Plates 18, projecting over the opening $16^2$, are yieldably held upon the upper surface of the arm by bolts 19, encircled by coiled springs 20, placed under tension by thumb-nuts 20', adjustable on the bolts 19. By this means a tension may be brought to bear upon the target 42 as it passes along the ways 16'. The ways 16' are connected or terminate at their inner ends in a pocket 17', which lies beneath a feed-opening 17 in the arm 16. Arranged beneath the arm 16 in a suitable bearing 38 is a double catch actuated by a spring 39 and a vertically-moving piece 36, operated by mechanism hereinafter described. This catch consists of a bar having two upwardly-extending points 37 and 37', which operate through openings 36', formed in one of the ways 16' in a manner that the target 42 is held within the slot until released by contact with the vertically-moving piece 36. Arranged upon the opposite side of the movable frame 13 is the mechanism for operating the catch or trip 37 37', which consists in a ratchet-wheel 21, mounted upon a stud 22, a pivoted lever 23, having a pawl 25 connected to the said lever, a second pawl 26, also engaging with the ratchet-wheel 21 and pivoted to the frame 13 by a stud 32. This pawl 26 is pivotally connected to a bar 34, operating in guides 34', and the said bar provided with a horizontal segmental trip-piece 36. The two pawls 25 and 26 are connected the one with the other by a coil-spring 27, and the lever 23, fitted with a spring 29 and stop 24, is attached, by means of a spring 31, to a lug 31', projecting from the pawl 26. The lever 23 has secured to its lower end the operating rope or cord 30. A bell 45, attached to the frame 13, and spring-tapper 45', connected to the pawl 26, give notice every time the trip 36 is operated, and a small bell 44, having a vibrating tapper, will indicate the number of revolutions of the throwing-arm 16. A screen 40, having an opening 43 and supported on arms 46, secured to the frame 1, is fitted in position to protect the operator from the movement of the arm 16.

The operator by means of the pedals 7 and the gearing imparts a rapid rotary movement to the arm 16. The targets 42 are fed through the opening 43 into the pocket 17' and are thrown by centrifugal force against the pin 37, the pin 37' having been retracted by the bar 38', which will be forced downward by the spring 38 as it moves off the trip 36. As the arm 16 comes around the cord 30 is pulled, swinging the lever 23 and the pawl 25, thus moving the ratchet-wheel one tooth, and thereby depressing the inner or contacting end of the pawl, which swings its outer end upwardly and elevating the trip 36. The bar 38, riding up on the trip 36, is swung upward, thus retracting the pin 37 and allowing the target 42 to be thrown out of the machine along the ways 16'.

Various slight modifications and changes may be made in the details of construction without departing from the spirit of the invention. Therefore I do not wish to confine myself to the exact construction shown and described.

Having thus described my invention, what I claim, and desire to secure by Letters Patent, is—

1. In a target-trap, a rotatable arm adapted to throw a target, means for releasing the targets comprising a pivotally-supported stop carried by the arm, a trip engaging said stop, a lever connected to the trip, a ratchet-wheel contacting with the lever, a pawl for operating the ratchet, and a swinging arm connected to the pawl and the lever for operating the same, substantially as described.

2. In a target-trap, a rotatable arm adapted to throw a target, means for releasing the targets comprising a pivotally-supported stop carried by the arm, a trip engaging said stop, a lever connected to the trip, a ratchet-wheel contacting with the lever, a pawl for operating the ratchet-wheel, a spring connecting the pawl and lever to hold them in contact with the ratchet-wheel, a swinging arm connected to the pawl, and springs connected to the free end of the said arm for normally holding it in position, substantially as described.

In testimony whereof I have hereunto signed my name in the presence of two subscribing witnesses.

DAVID J. SCHULTE.

In presence of—
R. B. WEAVER,
T. A. STEELE.